United States Patent [19]

Wang et al.

[11] Patent Number: 5,373,034
[45] Date of Patent: Dec. 13, 1994

[54] DENTIN ADHESIVE CONTAINING 2-HYDROXYETHYL METHACRYLATE AND ESTERIFICATION PRODUCT OF POLYVINYL ALCOHOL AND ACRYLOYL CHLORIDE

[75] Inventors: Yng J. Wang; Yih-Wen Gung; Kuo H. Hsia, all of Taipei,

[73] Assignee: National Science Council, Taipei, Taiwan, Prov. of China

[21] Appl. No.: 117,493

[22] Filed: Sep. 7, 1993

[51] Int. Cl.$^5$ ............... C08L 67/00; C08L 67/07; A61C 5/00
[52] U.S. Cl. ............... 523/118; 524/317; 525/59; 528/271; 528/361; 433/215
[58] Field of Search ............... 523/118; 524/317; 528/361, 271; 525/59; 433/215

[56] References Cited

U.S. PATENT DOCUMENTS 5,264,513 11/1993 Ikemura et al. ............... 523/118

OTHER PUBLICATIONS

Hasegawa T. et al., "Bonding Stability and Shelf Life of Gluma" Dental Materials/May 1989, 151.
Henderson L. J. et al., "Gluma dentin adhesive: Effectiveness and shelf life" Dental Material/Sep. 1989, 307.
Asmussen E. et al., "Bonding of restorative resins to dentine promoted by aqueous mixtures of aldehydes and active monomers" International Dental Journal 1985 vol. 35, 160–165.
Munksgaard E. C. et al., "Bond Strength Between Dentin and Restorative Resins Mediated by Mixtures of HEMA and Glutaraldehyde" J. Dent Res 63 (8): 1087–1089, Aug., 1984.
Asmussen Erik et al., "Adhesion to dentin by means of Gluma resin" Scand J. Dent Res 1988; 96: 584–9.

Primary Examiner—Veronica P. Hoke
Assistant Examiner—LaVonda R. DeWitt
Attorney, Agent, or Firm—W. Wayne Liauh

[57] ABSTRACT

A primer composition has been discovered which improves bonding of dentin and filler resin. The primer composition disclosed in the present invention contains, in weight ratio of 20:1 to 5:1, of 2-hydroxyethyl methacrylate and the esterification product of polyvinyl alcohol and acryloyl chloride. The weight average molecular weight of polyvinyl alcohol ranges from 60,000 to 85,000 with residual acetyl content is less than 10%. The esterification of OH group in polyvinyl alcohol ranges from 5 to 40 mole percent. The present invention does not contain glutaraldehyde, but provides greater bonding strength.

6 Claims, 1 Drawing Sheet

DENTIN ADHESIVE CONTAINING 2-HYDROXYETHYL METHACRYLATE AND ESTERIFICATION PRODUCT OF POLYVINYL ALCOHOL AND ACRYLOYL CHLORIDE

FIELD OF THE INVENTION

This invention relates to an adhesive composition, or a so-called primer composition, for the bonding of filler resin to dentin. More specifically this invention relates to an adhesive composition for bonding filler resin to dentin which contains an esterification product of polyvinyl alcohol and acryloyl chloride.

BACKGROUND OF INVENTION

Adhesion of resin to dentin presents a quite different task from adhesion to enamel. Acid etching can be used to facilitate the adhesion of resin to enamel. However, dentin is attached to the root and there exists moisture. Acid etching can be irritating and cause discomfort. At the same time, dentin fluid may leak out and reduces retentive resin tags, thus hampering the physical adjoinment of the resin and dentin. Therefore, acid etching method cannot be used for the adhesion of resin to dentine. Hence, new development direction of dentin adhesives is directed toward the formation of chemical bonding of resin to the organic and inorganic components of dentin.

The main component of dentin is approximately 75% inorganic compound, of which with hydroxyapatite being the major component, 20% organic material, which primarily consists of collagen, and 5% moisture. A dentin adhesive can provide bonding either with hydroxyapatite (such commercial product as Bondlite, Scotchbond, Dentin Bonding Agent, Clearfil New Bond, Prisma Universal Bond or Scotchbond, etc.) or with organic collagen (such as GLUMA, Dentin Adhesit, etc.) The relative effectiveness of these products is still being studied clinically, each having its respective advantages and disadvantages.

Both of the commercial products of GLUMA and Scotchbond 2 contain 2-hydroxyethyl methacrylate, hereinafter HEMA. The development history, composition, and mechanism of bonding of these two competing products are as follows:

A. GLUMA Bonding System

1. Development: Developed by Asmusen and Munksgaard of Denmark in 1984 and commercialized in 1987.
2. Composition: Etchant: 37% phosphoric acid for use with enamel. Cleaner: 0.5 M EDTA, to remove smear layer. Primer: 5% glutaraldehyde, 35% HEMA. Sealer: Unfilled BIS-GMA resin.
3. Mechanism:

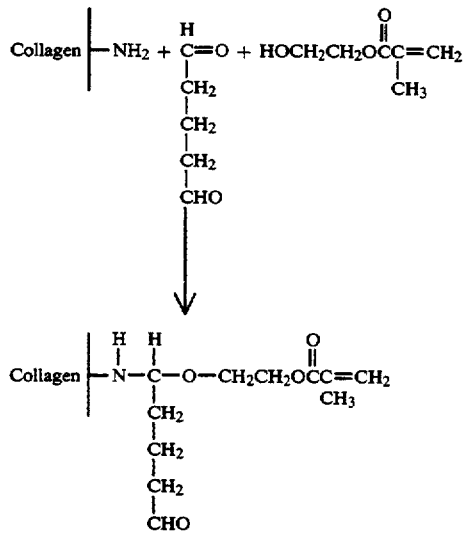

B. Scotchbond 2 Bonding System

1. Development: Commercialized in 1987 by 3M
2. Composition: Etching gel: 37% phosphoric acid, for etching enamel. Primer: Maleic acid, HEMA Adhesive: HEMA, Bis-GMA resin
3. Mechanism:

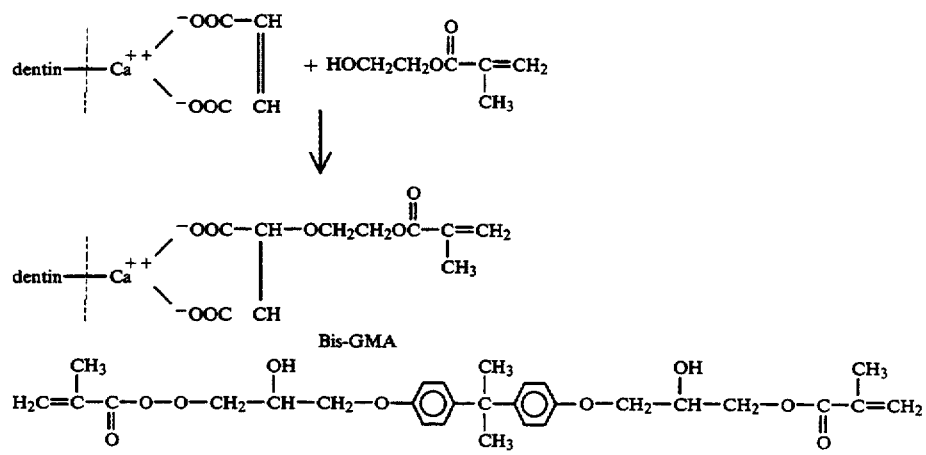

The above GLUMA bonding system contains glutaraldehyde. It has been shown through LD 50 value from tests conducted on animals that glutaraldehyde is toxic (the tests run on mice using 25% solution, at a dosage of 2.38 ml/kg, via oral administration, as well as via subcutaneous injection to rabbits, at a dosage of 2.56 ml/kg), and it also causes cross-linking among proteins, resulting in light toxicity. It is thus desirable to develop a bonding composition for dentin that provides improved bonding characteristics and does not contain glutaraldehyde.

SUMMARY OF THE INVENTION

The primary object of the present invention is to develop an adhesive composition for bonding dentin which provides improved adhesion and contains no glutaraldehyde. More specifically, the primary object of the present invention is to provide an adhesive composition which is suitable for bonding dentin with filler resin and which does not contain toxic components such as glutaraldehyde. The adhesive composition disclosed in the present invention contains, in weight ratio, from 20 to 5 parts of 2-hydroxyethyl methacrylate for every part of the esterification product of polyvinylalcohol (PVA) and acryloyl chloride (AC). The weight average molecular weight of PVA preferably ranges from 60,000 to 85,000, with residual acetyl content less than 10%. Furthermore, it is preferred that about 5 to 40 mole percent of OH groups in PVA are reacted with acryloyl chloride.

The esterification product of PVA and acryloyl chloride of the present invention contains hydroxy and ethylene groups. The hydroxy group and collagen form a hydrogen bonding, and at the same time the ethylene group combines with a unsaturated bond of the resin to form a covalent bond.

In the present invention, the 2-hydroxyethyl methacrylate can be used as a solvent for the esterification product of PVA and acryloyl chloride during the purification thereof. It can also react with ethylene group of the esterification product as well as with the unsaturated bond of the resin during a subsequent light irradiation process to cure the resin.

DETAILED DESCRIPTION OF THE PREFERRED EMBODIMENTS

Figure 1:
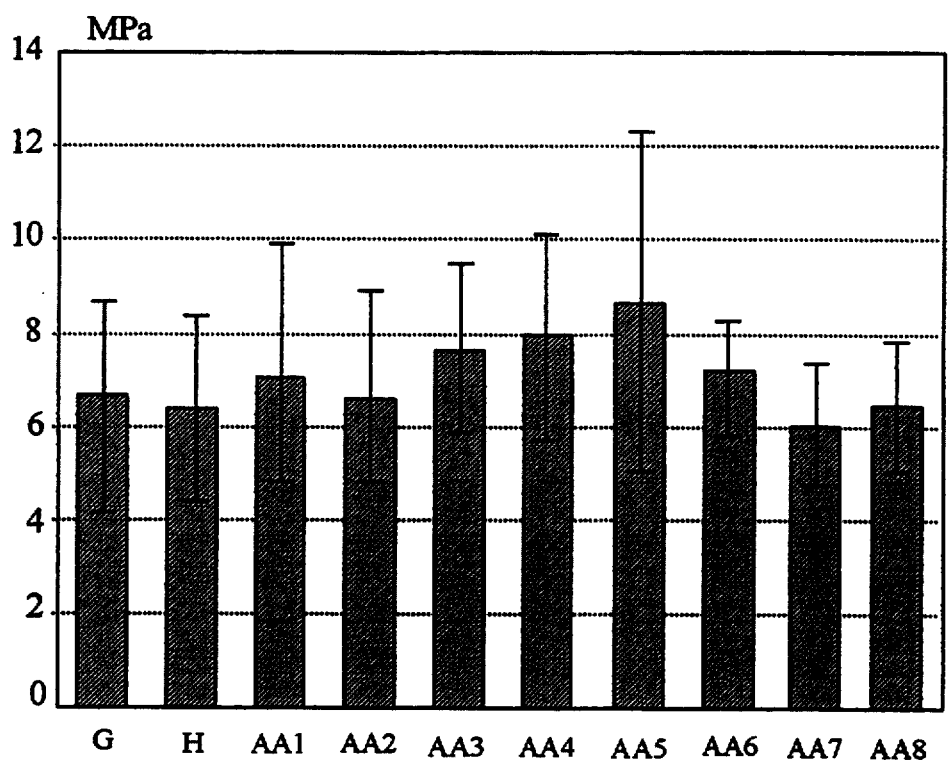
FIG. 1 shows the tensile bond strength of the primer composition of the present invention.

The present invention discloses a dentin/resin filler adhesive composition which contains, in weight ratio, from 20 to 5 parts of 2-hydroxyethyl methacrylate and 1 part of the esterification product of polyvinylalcohol (PVA) and acryloyl chloride. The weight average molecular weight of PVA preferably ranges from 60,000 to 85,000, with residual acetyl content is preferably less than 10%. More preferably, the weight average molecular weight of PVA ranges from 65,000 to 79,000, and the extent of rsidual acetyl content is preferably less than 5%.

Furthermore, it is preferred that about 5 to 40 mole percent of OH groups in PVA are reacted with acryloyl chloride. More preferably, 10 to 33 mole percent of the OH groups the PVA are esterified in the esterification product of PVA-acryoyl acid (or PVA-AA).

Not only that the present invention does not require the use of the toxic glutaraldehyde in order to provide a desired bonding between dentin and the resin filler, test results also show that the bonding strength improves when the primer disclosed in this invention is used instead of the commercially available GLUMA primer system. The present invention will now be described more specifically with reference to the following examples. It is to be noted that the following descriptions of examples including preferred embodiments of this invention are presented herein for purpose of illustration and description; it is not intended to be exhaustive or to limit the invention to the precise form disclosed.

EXAMPLE 1

(a) Esterification of PVA-AA and purification

In this example, polyvinylalcohol (PVA) and acryloyl chloride (AC) were reacted to form an esterification product, which was subsequently purified according to the following procedure:

1. 5 g of dry PVA (weight average molecular weight 72,000, 98% purity, made by Merck-Schuchardt, Art. 821038, Germany) was placed in a pre-dried 500 ml reactor;
2. 133 milligram of N-methyl-2-pyrrolidon was added to the reactor, which was heated to 85° C. The reaction mixture was stirred continuously until all PVA was dissolved. 34 ml of N-Methyl-2-pyrrolidon was added to the reaction mixture.
3. After the solution became clear (after 1 hour), the reactor temperature was lowered to room temperature.
4. 59.2 ml of acryloyl chloride (AC) was added to the reaction mixture, drop by drop using a pipet, after the reactor has reached room temperature; stirring continued for 3 to 5 minutes.
5. The reaction product from step 4 was placed in water about 40 times its volume to stop the reaction and remove un-reacted AC and N-methyl-2-pyrrolidone; the precipitates were collected and dried.
6. The dried product from step 5 was placed in HEMA and stirred while temperature was maintained at 30° C.; the liquid phase was collected and the un-reacted PVA was discarded.
7. The purification steps of 5 and 6 were repeated at least three times and the product was collected as a liquid phase. The product was kept in tightly sealed dark container, which was placed in a 4° C. refrigerator.
8. The elements in the esterified PVA-AA compound were analyzed which contained 53.49% of carbon and 6.86% of hydrogen. According to the following calculation, 35.3 mole % of the OH groups in PVA have reacted with AC to form esterification product with acryloyl chloride.

Molecular formula of PVA-AA $= (C_2H_4O)_x(C_5H_6O_2)_y$ $C/H = [12(2x+5y)]/(1(4x+6y)] = 53.49/6.86$ Therefore, $y/(x+y) = 35.3\%$ (b) Preparation of Test Sample Using PVA-AA as Dentin Adhesive Primer 1. 10 ml of the liquid phase from step (a) was placed in 200 ml of water to obtain 0.561 g of PVA-AA precipitates.
2. 0.561 g of PVA-AA was dissolved in 3.5 grams of HEMA to obtain 7 ml of solution, which was called mother sample A
3. Appropriate amounts of mother sample A were obtained and to which a given quantity of HEMA was added to form a group of specimen as shown in Table 1, each having varying proportions of PVA-AA and HEMA. These samples were placed in a dark area at a low temperature (4C).

|  | Test Sample | | | | | | | | | |
| --- | --- | --- | --- | --- | --- | --- | --- | --- | --- | --- |
| Composition | G* | H | AA1 | AA2 | AA3 | AA4 | AA5 | AA6 | AA7 | AA8 |
| HEMA (g) | 0.35 | 0.35 | 0.35 | 0.35 | 0.35 | 0.35 | 0.35 | 0.35 | 0.35 | 0.35 |
| PVA-AA | 0 | 0 | 0.0056 | 0.014 | 0.021 | 0.028 | 0.035 | 0.042 | 0.049 | 0.0561 |

*The composition of G is the same as the primer of GLUMA bonding system; it contains 0.35 g of HEMA and 0.05 g of glutaraldehyde (c) Tensile Bonding Test 1. 350 pieces of human molars were collected washed and placed in a 0.2% sodium azide preservative normal saline solution. The solution was then stored in a refrigerator.
2. The molars were placed in a phosphate-bufferred saline, or PBS, solution 24 hours prior to the test.
3. In order to meet the design of the clamp of the MTS tester used in this test (MTS-Bionix 858, MTS System Co., U.S.A.), a male mold was fabricated using Acrylic plastic. (The mold containing two connecting concentric cylinders, a base cylinder with 3 cm in diameter and 2 cm in height, the upper cylinder has a diameter of 1.5 cm and 3 cm length)
4. A silicone impression material (such as Silaplast, Silasoft or DETAX, by Karl Hubes Gmbh & Co., KG, Germany) was used to produce a female mold from the acrylic mold.
5. A gypsum composition (such as Die-Keen by Columbus Dental Miles Inc., U. S. A.) was prepared according to the ratio recommended by the manufacturer which was poured into the silicone impression female mold obtained above.
6. The molars were placed in the center of the gypsum with the top of the molars exposed.
7. The gypsum was removed from the mold after it was solidified.
8. A model trimmer was used to grind the top of the teeth to a flat surface, exposing at least 4 mm diameter of dentin.
9. A flat dentin surface was prepared perpendicular to the tooth axis by grinding using a wet carborundum paper, starting from coarse grit such as No. 120 and gradually stepping up to No. 180, and No. 220, and ending with No. 320.
10. The surface of the dentin was treated for 30 seconds with a commercial GLUMA bonding system cleaner (contains 0.5 M EDTA, pH=7.4), afterward, it was washed and dried.
11. The sample was randomly divided into several batches, each batch containing 12 teeth. Each batch was then coated with 0.01 milliliter of different dentin adhesive as shown in Table 1 on the dentin. They were left to dry after 30 seconds.
12. An adhesive tape with pre-cut 4 mm diameter hole was placed on the center of the dentin.
13. A layer of 0.01 ml sealer (GLUMA bonding system) was coated on the exposed 4 mm diameter hole.
14. A cylindrical Teflon mold (outer diameter, 20 mm; inner diameter, 4 mm; height, 4 mm) was prepared and placed on the dentin, matching the inside hole to the spot coated with sealer.
15. The Teflon mold was filled with a light-curing composite (commercial name Lumifor Light Cure Composite, by Bayer dtal, Germany). A ringed holder was placed into the un-cured composite, penetrating at least 3 mm.
16. The composite was cured with light for 60 seconds. The Teflon mold was removed after curing to obtain the tensile testing specimen.
17. The prepared samples were placed in 37° C. warm water for 24 hours.
18. The base of the gypsum mold was clamped on the lower clamp of the MTS-Bionix 858 tester. The upper clamp was secured with a steel wire ring which was attached to the holder of the specimen. Measure the tensile strength with a crosshead speed of 1 mm/min. The results are shown in FIG. 1.

From FIG. 1, it can be seen that dentin adhesive of this invention containing PVA-AA (AA1 to AA8) has a higher tensile bonding strength compared to adhesives which do not contain PVA-AA (Samples G and H). Furthermore, sample AA5 has a bond strength which is 38% higher than dentin primer of commercial GLUMA bonding system (sample G).

EXAMPLE 2

Using the synthesis and purification procedures outlined in Example 1, except that the samples obtained at different levels of esterification, the results of the elemental analysis and calculated esterification rates are shown as below:

|  | PVA-AA | | | | |
| --- | --- | --- | --- | --- | --- |
| Sample | 5A1 | 5A2 | 5A3 | 5A4 | 5A5 |
| C, % | 46.12 | 49.11 | 51.28 | 50.49 | 52.78 |
| H, % | 6.85 | 6.85 | 6.78 | 6.88 | 6.85 |
| Extent of Esterification | 10.89 | 22.46 | 29.96 | 26.51 | 33.12 |

Using the best formulation of example 1 (HEMA 0.35 g, PVA-AA 0.035 g) for dentin primer, shear bonding strength of the adhesive is measured using the following procedure.

(d) Shear bonding strength test

Repeat the tensile bonding test as outline in Example 1 from step 1 to 15, then the following steps were added.
16. Cure the composite with light for 60 seconds. The sample is ready for shear bonding strength test.
17. Clamp the base of the cast mold on the lower clamp of the MTS-Bionix 858 tester. Test the shear bonding strength using 1 mm/min. cross-head speed. The result is shown in FIG. 2.

Figure 2:
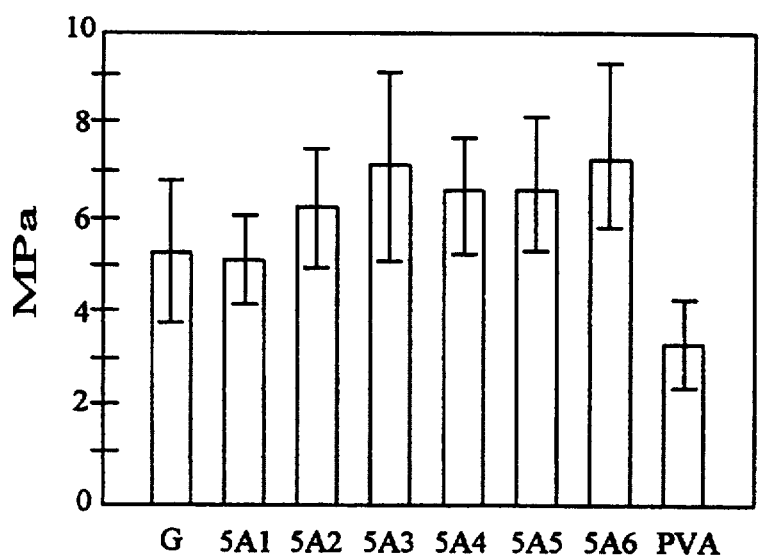
FIG. 2 shows the shear bond strength of the primer composition of the present invention.

In FIG. 2, the sample labelled "PVA" is the primer containing unesterified PVA and HEMA (0.05 g). The sample using GLUMA bonding system primer is labelled as sample G. Sample 5A4.6 is for the sample containing 0.35 g of HEMA and 0.05 g of PVA-AA, which was prepared using the same procedure as sample 5A4 except that the purification steps (5 and 6) were repeated 6 times. From FIG. 2, it can be seen that all the five samples of PVA-AA/HEMA having different extents of PVA-AA esterification exhibit a superior shear bonding strength compared to the commercially available GLUMA bonding system primer. Among these samples, the adhesion system prepared from HEMA and PVA-AA with 33.12% esterification shows the highest shear bonding strength. Its shear bonding strength is 41.2% higher than the primer of GLUMA bonding system.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A primer for use to bond dentin and a composite resin, said primer comprising 2-hydroxyethyl methacrylate and an esterification product of polyvinyl alcohol and acryloyl chloride in a weight ratio of 20-5:1.

2. The primer for use to bond dentin and a composite resin as claimed in claim 1 wherein said polyvinyl alcohol has weight average molecular weight rangeing from 60,000 to 85,000.

3. The primer for use to bond dentin and a composite resin as claimed in claim 1 wherein said polyvinyl alcohol has an alcohol content greater than 90%.

4. The primer for use to bond dentin and a composite-resin as claimed in claim 1 wherein at least 5 to 40 mole percent of the OH groups of said polyvinyl alcohol are esterified with said acryloyl chloride.

5. The primer for use to bond dentin and a composite resin as claimed in claim 1 wherein 10 to 33 mole percent of the OH groups of said polyvinyl alcohol are esterified with said acryloyl chloride.

6. The primer for use to bond dentin and a composite resin as claimed in claim 1 wherein said polyvinyl alcohol has weight average molecular weight rangeing from 65,000 to 79,000.

* * * * *